(12) United States Patent
Kim et al.

(10) Patent No.: US 12,711,727 B2
(45) Date of Patent: Aug. 18, 2026

(54) METHOD AND APPARATUS FOR OBJECT IDENTIFICATION USING HIERARCHICAL MODEL

(71) Applicant: NUVI LABS CO., LTD., Seoul (KR)

(72) Inventors: Dae Hoon Kim, Seoul (KR); Jey Yoon Ru, Seoul (KR)

(73) Assignee: NUVI LABS CO., LTD., Seoul (KR)

( * ) Notice: Subject to any disclaimer, the term of this patent is extended or adjusted under 35 U.S.C. 154(b) by 41 days.

(21) Appl. No.: 18/290,563

(22) PCT Filed: Sep. 7, 2023

(86) PCT No.: PCT/KR2023/013394
§ 371 (c)(1),
(2) Date: Nov. 14, 2023

(87) PCT Pub. No.: WO2024/101625
PCT Pub. Date: May 16, 2024

(65) Prior Publication Data
US 2025/0086925 A1 Mar. 13, 2025

(30) Foreign Application Priority Data
Nov. 9, 2022 (KR) ........................ 10-2022-0148837

(51) Int. Cl.
*G06V 10/26* (2022.01)
*G06V 10/77* (2022.01)
*G06V 10/82* (2022.01)

(52) U.S. Cl.
CPC .......... *G06V 10/26* (2022.01); *G06V 10/7715* (2022.01); *G06V 10/82* (2022.01)

(58) Field of Classification Search
CPC ..... G06V 10/26; G06V 10/7715; G06V 10/82
See application file for complete search history.

(56) References Cited

U.S. PATENT DOCUMENTS

2018/0039866 A1* 2/2018 Kiapour ................. G06V 10/95
2019/0318405 A1* 10/2019 Hu ......................... G06V 20/00
2024/0071049 A1* 2/2024 Syeda-Mahmood ........................ G06V 10/449

FOREIGN PATENT DOCUMENTS

KR 10-1882743 B1 8/2018
KR 10-2019-0021130 A 3/2019
(Continued)

OTHER PUBLICATIONS

Kim, D.H. et al., "Real-time purchase behavior recognition system based on deep learning-based object detection and tracking for an unmanned product cabinet," Expert Systems with Applications, vol. 143 (2020).

(Continued)

*Primary Examiner* — David Perlman
(74) *Attorney, Agent, or Firm* — Maschoff Brennan

(57) ABSTRACT

The present disclosure relates to a method and apparatus for object identification using a hierarchical model. An object identification method using a hierarchical model according to one embodiment of the present disclosure comprises detecting an object area from an object image in which an object is located based on a trained object area extraction model and cropping the detected object area by an object identification apparatus; and identifying object type information of an object located in the object area cropped by the object identification apparatus based on an object type inference model by an object management server.

13 Claims, 10 Drawing Sheets

(56) References Cited

FOREIGN PATENT DOCUMENTS

| | | | |
|---|---|---|---|
| KR | 10-2110766 | B1 | 5/2020 |
| KR | 10-2022-0024238 | A | 3/2022 |

OTHER PUBLICATIONS

Aukkapinyo, K. et al., "Localization and Classification of Rice-grain Images Using Region Proposals-based Convolutional Neural Network," International Journal of Automation and Computing, vol. 17, Issue 2, pp. 233-246 (Apr. 2020).
Extended European Search Report dated Mar. 7, 2025 as received in Application No. 23804888.8.

* cited by examiner

METHOD AND APPARATUS FOR OBJECT IDENTIFICATION USING HIERARCHICAL MODEL

TECHNICAL FIELD

The present disclosure relates to a method and apparatus for object identification.

BACKGROUND ART

Recently, people's interest in health has been increasing: on the other hand, the number of people suffering from overweight or obesity is also gradually increasing. Overweight or obesity is a serious problem that causes various diseases such as diabetes and high blood pressure.

Therefore, to solve overweight or obesity, it is necessary to analyze one's eating habits first. In general, people know their likes and dislikes but do not remember the types of objects and how often they actually eat. Therefore, to analyze one's eating habits, it is necessary to identify the objects actually consumed and analyze the individual's eating habits based on the information on the identified objects.

However, since most of the currently disclosed techniques are limited to a simple search of object images captured through cameras, the resulting accuracy is significantly low. Moreover, since the accuracy of object type identification in image search is low, there is a problem that a larger error occurs in the following steps, such as calorie calculation.

For example, to identify the object actually consumed, a user has to input object information using a mobile terminal or an input apparatus. Here, the user takes an image of an object by executing an object-related application on the mobile terminal or running a normal camera capture mode. At this time, the user has to go through an inconvenience of searching for an object image captured by the object-related application and re-entering the object information from the search. Alternatively, when an object image is captured in the normal camera capture mode, the user has to go through an inconvenience of searching for a captured object image in the album, uploading the found object image to the object-related application, and finding the uploaded object image again to enter object information. Therefore, because performing object image capture and object identification separately leads to inconvenience, the frequency of uploading object information decreases significantly after the user captures several object images.

There may be cases where the user only takes an image of an object and enters object information at a later time. If a considerable amount of time elapses since the capture of the object image, the user may not remember the object information the user wanted to enter at the time of image capture and may be unable to record the object information: also, errors may occur in the analysis of eating habits due to uploading of incorrect object information. In addition, even if the user wants to input various pieces of object information for a captured object image, the user has no choice but to input only a few fixed details of object information set for each application. In this case, the user's eating habits may not be analyzed accurately due to the limited number of object information. As described above, as user inconvenience grows, satisfaction with services such as those that analyze an individual's eating habits through object identification tends to decrease.

DISCLOSURE

Technical Problem

To solve the problem above, embodiments of the present disclosure provide a method and apparatus for object identification using a hierarchical model to increase the object identification speed by identifying an object area by an object identification apparatus and identifying object type information by an object management server.

The embodiments of the present disclosure provide a method and apparatus for object identification using a hierarchical model to quickly determine an object located in an object image by classifying object categories in a stepwise manner using an object area extraction model and an object type inference model and by identifying object type information.

However, the technical problem to be solved by the present disclosure is not limited to the above but may be extended to other various problems belonging to the scope not departing from the technical principles and domain of the present disclosure.

Technical Solution

According to one embodiment of the present disclosure, an object identification method performed by an object identification system, an object identification method using a hierarchical model may be provided, the method comprising detecting an object area from an object image in which an object is located based on a trained object area extraction model and cropping the detected object area by an object identification apparatus; and identifying object type information of an object located in the object area cropped by the object identification apparatus based on an object type inference model by an object management server.

The cropping of the detected object area may detect an object area from the object image based on the trained object area extraction model by using a box surrounding the object or pixels occupied by the object.

The cropping of the detected object area may infer an object area by extracting a first feature point through a first image encoder of the trained object area extraction model and extracting a feature point area from the extracted first feature point.

The method further comprises classifying an object type category of an object located in the cropped object area by the object identification apparatus in a stepwise manner, wherein the identifying of the object type information may identify object type information using the classified category and the corresponding object type inference model by the object management server.

The classifying of the object type category in a stepwise manner may classify the category of an object located in the cropped object area sequentially from the highest major classification to the lowest minor classification by the object identification apparatus.

The identifying of the object type information may identify object type information using the lowest minor category, which is the classified category, and the corresponding object type inference model by the object management server.

The identifying of the object type information may determine the object type information as one of a plurality of classes belonging to the lowest minor category by the object management server.

The identifying of the object type information may extract a second feature point through the classified category and a second image encoder of the corresponding object type inference model and infer object type information by entering the extracted second feature point into a feature point decoder by the object management server.

Meanwhile, according to another embodiment of the present disclosure, an object identification method performed by an object identification apparatus, an object identification method using a hierarchical model may be provided, the method comprising detecting an object area from an object image in which an object is located based on a trained object area extraction model and cropping the detected object area; and identifying object type information of an object located in the cropped object area based on an object type inference model.

Meanwhile, according to yet another embodiment of the present disclosure, an object identification method performed by an object management server, an object identification method using a hierarchical model may be provided, the method comprising detecting an object area from an object image in which an object is located based on a trained object area extraction model and cropping the detected object area; and identifying object type information of an object located in the cropped object area based on an object type inference model.

Meanwhile, according to still another embodiment of the present disclosure, an object identification system, an object identification system using a hierarchical model may be provided, the system comprising an object identification apparatus detecting an object area from an object image in which an object is located based on a trained object area extraction model and cropping the detected object area; and an object management server identifying object type information of an object located in the object area cropped by the object identification apparatus based on an object type inference model.

The object identification apparatus may detect an object area from the object image based on the trained object area extraction model by using a box surrounding the object or pixels occupied by the object.

The object identification apparatus may infer an object area by extracting a first feature point through a first image encoder of the trained object area extraction model and extracting a feature point area from the extracted first feature point.

The object identification apparatus may classify an object type category of an object located in the object area cropped by the object identification apparatus in a stepwise manner, and the object management server may identify object type information using the classified category and the corresponding object type inference model.

The object management server may classify the category of an object located in the cropped object area sequentially from the highest major classification to the lowest minor classification.

The object management server may identify object type information using the lowest minor category, which is the classified category, and the corresponding object type inference model.

The object management server may determine the object type information as one of a plurality of classes belonging to the lowest minor category.

The object management server may extract a second feature point through the classified category and a second image encoder of the corresponding object type inference model and infer object type information by entering the extracted second feature point into a feature point decoder.

Meanwhile, according to yet still another embodiment of the present disclosure, an object identification apparatus, an object identification apparatus using a hierarchical model may be provided, the apparatus comprising a memory storing one or more programs; and a processor executing the stored one or more programs, wherein the processor is configured to detect an object area from an object image in which an object is located based on a trained object area extraction model, crop the detected object area, and identify object type information of an object located in the cropped object area using an object type inference model.

Meanwhile, according to still yet another embodiment of the present disclosure, an object management server, an object management server using a hierarchical model may be provided, the server comprising a memory storing one or more programs; and a processor executing the stored one or more programs, wherein the processor is configured to detect an object area from an object image in which an object is located based on a trained object area extraction model, crop the detected object area, and identify object type information of an object located in the cropped object area using an object type inference model.

Advantageous Effects

The present disclosure may provide the following effects. However, since it is not meant that a specific embodiment has to provide all of or only the following effects, the technical scope of the present disclosure should not be regarded as being limited by the specific embodiment.

The embodiments of the present disclosure may increase an object identification speed by identifying an object area in an object identification apparatus and identifying object type information in an object management server.

The embodiments of the present disclosure may quickly determine an object located in an object image by classifying object categories in a stepwise manner using an object area extraction model and an object type inference model and by identifying object type information.

The embodiments of the present disclosure may increase the efficiency of object identification operation by adjusting categories to be classified by considering a real-time issue, resource status, or computational load of the object identification apparatus at the time of classification.

The embodiments of the present disclosure may reduce the object identification time or improve the object identification accuracy by quickly performing the operation of object category classification or object information determination, which is difficult to perform for the object identification apparatus alone, in conjunction with the object management server.

MODE FOR DISCLOSURE

Since the present disclosure may be modified in various ways and may provide various embodiments, specific embodiments will be depicted in the appended drawings and described in detail with reference to the drawings. However, it should be understood that the specific embodiments are not intended to limit the gist of the present disclosure to the specific embodiments; rather, it should be understood that the specific embodiments include all of the modifications, equivalents or substitutes belonging to the technical principles and scope of the present disclosure. In describing an embodiment disclosed in the present disclosure, if it is determined that a detailed description of a related art incorporated herein unnecessarily obscure the gist of the embodiment, the detailed description thereof will be omitted.

Terms such as first and second may be used to describe various constituting elements, but the constituting elements should not be limited by the terms. The terms are introduced to distinguish one element from the others.

Terms used in the present disclosure are intended only for describing a specific embodiment and are not intended to limit the technical scope of the present disclosure. Terms used in the present disclosure have been selected as much as possible from general terms relevant to the functions of the present disclosure and currently in wide use; however, the selection of terms may vary depending on the intention of those persons skilled in the corresponding field, precedents, or emergence of new technologies. Also, in a particular case, some terms may be selected arbitrarily by the applicant, and in this case, detailed definitions of the terms will be provided in the corresponding description of the present disclosure. Therefore, the terms used in the present disclosure should be defined not simply by their apparent names but based on their meanings and contexts throughout the present disclosure.

A singular expression should be understood to indicate a plural expression unless otherwise explicitly stated according to a particular context. The term "include" or "have" is used in the present disclosure to indicate existence of an embodied feature, number, step, operation, constituting element, component, or a combination thereof; and should not be understood to preclude the existence or possibility of adding one or more other features, numbers, steps, operations, constituting elements, components, or a combination thereof.

Hereinafter, preferred embodiments of the present disclosure will be described in detail with reference to the accompanying drawings. In describing the present disclosure with reference to appended drawings, the same or corresponding constituting element is assigned the same reference number, and repeated descriptions thereof will be omitted.

Figure 1:
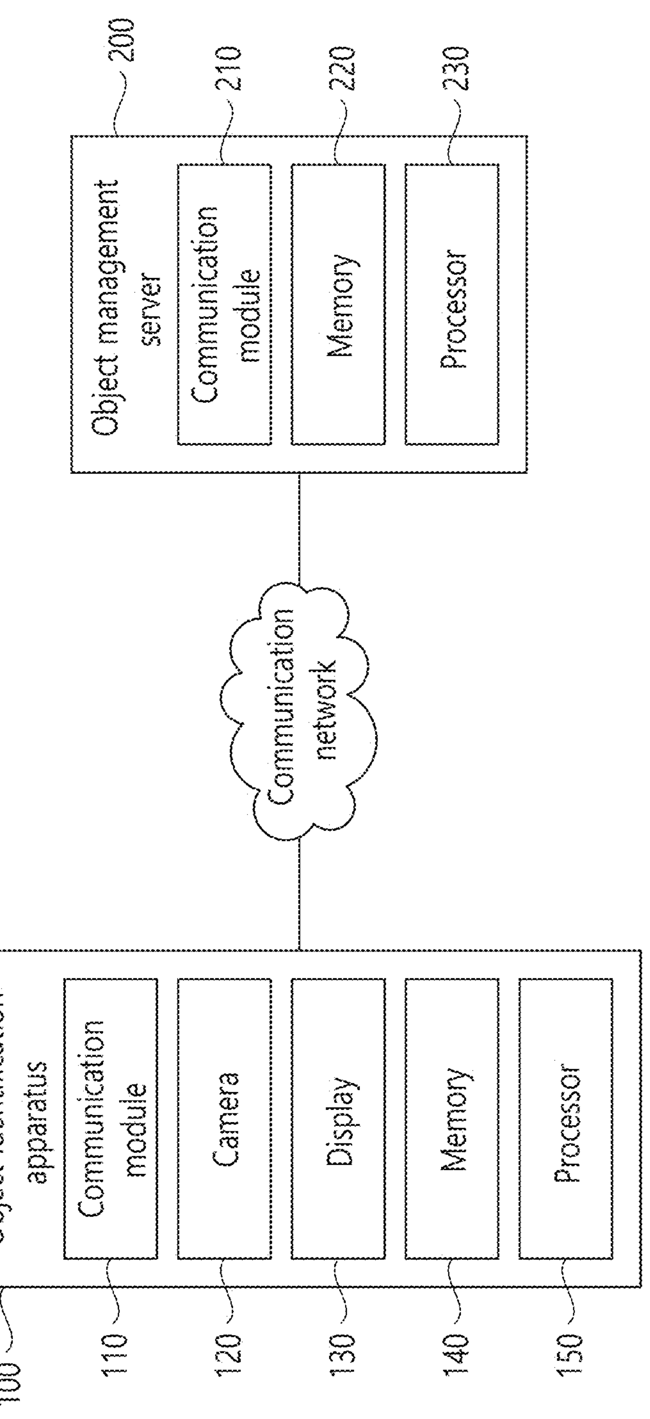
FIG. 1 illustrates the structure of an object identification system using a hierarchical model according to one embodiment of the present disclosure.

FIG. 1 illustrates the structure of an object identification system using a hierarchical model according to one embodiment of the present disclosure.

First, referring to FIG. 1, the object identification system 10 according to the present disclosure may include an object identification apparatus 100 and an object management server 200 communicating with the object identification apparatus 100.

The object identification apparatus 100 may detect an object area from the object image in which an object is located based on a trained object area extraction model and crop the detected object area. Then, the object identification apparatus 100 may transmit the cropped object area to the object management server 200.

The object management server 200 may identify the object type information of an object located in the object area cropped by the object identification apparatus 100 based on an object type inference model.

As described above, the operation of identifying object type information may be performed in the object management server 200 rather than in the object identification apparatus 100. Here, the object management server 200 may be implemented as a cloud server. Alternatively, the object identification apparatus 100 may perform both the operations of detecting the object area and identifying object type information.

The above scheme intends to speed up object area detection and object type identification operations. For example, suppose a user takes a picture of an object (food) using a mobile terminal containing the object identification apparatus 100, and the file size of the original image is 4 MB; if the user transmits the original image file of 4 MB to the object management server 200 in the cloud, the image file may occupy an excessive amount of storage capacity. Therefore, the object identification apparatus 100 may cut out only the object (food) area from the original image and transmit, for example, only 200 KB, to the object management server 200 in the cloud. In this way, the mobile terminal may perform the operation of detecting the object area, while the cloud may perform the operation of identifying object type information. Alternatively, the mobile terminal may perform both the operations of detecting the object area and identifying object type information.

Here, where to perform the operation of detecting the object area and the operation of identifying object type information may be determined based on at least one of the size of data to be transmitted to the object management server 200, hardware performance of the object identification apparatus 100, communication speed between the object management server 200 and the object identification apparatus 100, size of an object area extraction model or object type inference model, and identification accuracy of the object type information. For example, when the data capacity is lower than a preset threshold, the hardware performance is high, the communication speed is low, the model size is small, and the accuracy is high, it may be advantageous that the object identification apparatus 100 performs the operations of detecting an object area and identifying the object type information. On the other hand, when the data capacity is higher than the preset threshold, hardware performance is low, communication speed is high, model size is large, and accuracy is low, it may be advantageous that the object identification apparatus 100 performs the operation of detecting the object area and the object management server 200 performs the operation of identifying object type information. At this time, the object identification apparatus 100 may convert a detected object area and transmit the converted object area to the object management server 200 instead of cutting out the detected object area. For example, the object identification apparatus 100 may convert a detected object area into a thumbnail with a lower resolution and quickly send the thumbnail image to the object management server 200 or convert the file extension or file format when sending a file containing the object area to the object management server 200.

Meanwhile, as shown in FIG. 1, the object identification apparatus 100 may include a communication module 110, a camera 120, a display 130, a memory 140, and a processor 150. The object management server 200 may include a communication module 210, a memory 220, and a processor 230.

However, not all the constituting elements shown in the figure are essential constituting elements. The object identification system 10 may be implemented using more or fewer constituting elements than shown in the figure.

In what follows, a specific structure and operation of each constituting element of the object identification system 10 of FIG. 1 will be described.

First, a specific structure and operation of each constituting element of the object identification apparatus 100 will be described.

The communication module 110 may include one or more modules that enable communication between the object identification apparatus 100 and wireless communication apparatuss or communication between the object identification apparatus 100 and the object management server 200. Also, the communication module 110 may include one or more modules connecting the object identification apparatus 100 to one or more networks.

The camera 120 may capture images or videos according to user operations. The camera 120 may comprise a single camera, multiple cameras, a single image sensor, or multiple image sensors. The camera 120 may comprise at least one of at least one 2D camera, at least one 3D camera, at least one stereo camera, and at least one image sensor. Here, the camera 120 may capture an image or a video of an object before or after a meal according to the user's manipulation.

The display 130 may implement a touch screen by forming a mutual layer structure or being integrated with a touch sensor. The touch screen may provide an input interface between the object identification apparatus 100 and the user and, at the same time, an output interface between the object identification apparatus 100 and the user.

The memory 140 may store data supporting various functions of the object identification apparatus 100. The memory 140 may store one or more programs running on the object identification apparatus 100, a plurality of application programs or applications, data for the operation of the object identification apparatus 100, and commands. At least some of the application programs may be downloaded from the object management server 200 through wireless communication. Also, at least some of the application programs may exist for the basic functions of the object identification apparatus 100. Meanwhile, the application programs may be stored in the memory 140, installed on the object identification apparatus 100, and driven by the processor 150 to perform the operation (or function) of the object identification apparatus 100.

In addition to operations related to the application program, the processor 150 may generally control the overall operation of the object identification apparatus 100. The processor 150 may provide or process appropriate information or functions to the user by processing signals, data, or information input or output through the constituting elements described above or by running an application program stored in the memory 140.

In one embodiment, the processor 150 executes one or more programs stored in the memory 140 to detect an object area from the object image in which the object is located based on the trained object area extraction model, crops the detected object area, and identifies the object type information of the object located in the cropped object area based on an object type inference model.

According to embodiments, the processor 150 may extract an object area using a box surrounding the object or pixels occupied by the object in the object image based on the trained object area extraction model.

According to embodiments, the processor 150 may extract the first feature point through the first image encoder of the trained object area extraction model and extract a feature point area from the extracted first feature point to infer the object area.

According to embodiments, the processor 150 may detect an object area from the object image where the object is located based on the trained object area extraction model, crop the detected object area, classify the object type category of the object located in the cropped object area in a stepwise manner, and identify the object type information using the classified category and the corresponding object type inference model.

According to embodiments, the processor 150 may classify the category of an object located in the cropped object area sequentially from the highest major classification to the lowest minor classification.

According to embodiments, the processor 150 may identify object type information using the lowest minor category, which is a classified category, and the corresponding object type inference model.

According to embodiments, the processor 150 may determine the object type information as one of a plurality of classes belonging to the lowest minor category.

According to embodiments, the processor 150 may extract a second feature point through the classified category and a second image encoder of the corresponding object type inference model and infer object type information by entering the extracted second feature point into a feature point decoder.

According to embodiments, the object identification apparatus 100 may further include a communication module 210 communicating with the object management server 200, wherein the processor 150 may request identification of object type by transmitting the cropped object area and the classified category of the object type to the object management server 200 through the communication module 210 and receive the object type information determined based on the classified category and the corresponding object type inference model from the object management server 200.

Also, the processor 150 may control at least part of the constituting elements described with reference to FIG. 1 to drive an application program stored in the memory 140. Furthermore, to execute the application program, the processor 150 may combine at least two or more of the constituting elements included in the object identification apparatus 100. Here, detailed descriptions of the processor 150 will be given later.

Meanwhile, next, a specific structure and operation of each constituting element of the object management server 200 will be described.

The communication module 210 may include one or more modules that enable communication between the object identification server 200 and wireless communication apparatus or communication between the object management server 200 and the object identification apparatus 100. Also, the communication module 210 may include one or more modules connecting the object management server 200 to one or more networks.

The memory 220 may store data supporting various functions of the object management server 200. The memory 220 may store one or more programs running on the object management server 200, a plurality of application programs or applications, data for the operation of the object management server 200, and commands. At least some of the application programs may be downloaded from the object management server 200 through wireless communication. Also, at least some of the application programs may exist for the basic functions of the object management server 200. Meanwhile, the application programs may be stored in the memory 140, installed on the object management server 200, and driven by the processor 230 to perform the operation (or function) of the object management server 200.

In addition to operations related to the application program, the processor 230 may generally control the overall operation of the object management server 200. The processor 230 may provide or process appropriate information or functions to the user by processing signals, data, or information input or output through the constituting elements described above or by running an application program stored in the memory 220.

In one embodiment, the processor 230 may execute one or more programs related to the operation of determining object information from an object image stored in the memory 220 in conjunction with the object identification apparatus 100. For example, the processor 230 may classify, in a stepwise manner, the remaining categories unclassified by the object identification apparatus 100 among categories of an object located in a cropped object area and determine the object type information using the classified category and the corresponding object type inference model.

Up to this point, with reference to FIG. 1, the structure of the object identification system 10 according to the present disclosure has been described in detail. The object identification system 10 may include more or fewer constituting elements than shown in FIG. 1.

In what follows, with reference to FIGS. 2 to 6, an object identification method according to various embodiments of the present disclosure will be described.

Figure 2:
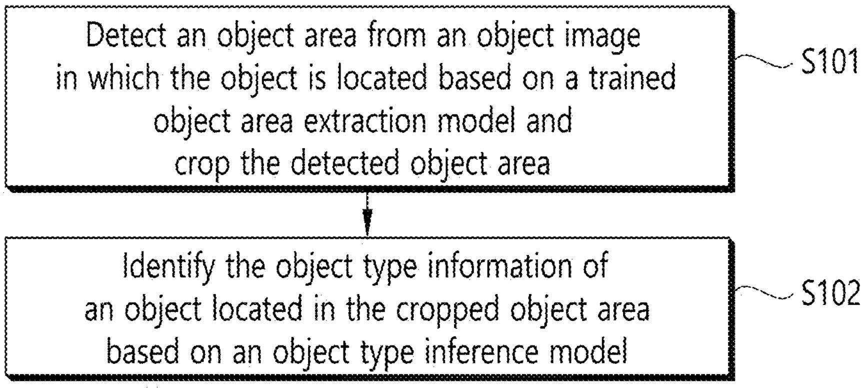
FIG. 2 is a flow diagram illustrating an object identification method using a hierarchical model according to one embodiment of the present disclosure.

FIG. 2 is a flow diagram illustrating an object identification method using a hierarchical model according to one embodiment of the present disclosure.

As shown in FIG. 2, in the S101 step, the object identification apparatus 100 using a hierarchical model according to one embodiment of the present disclosure detects an object area from an object image in which the object is located based on a trained object area extraction model and crops the detected object area. Next, the object identification apparatus 100 transmits the detected object area to the object management server 200.

In the S102 step, the object management server 200 identifies the object type information of an object located in the cropped object area based on an object type inference model.

As described above, the object identification apparatus 100 according to one embodiment of the present disclosure detects an object area from an object image in which the object is located based on the object area extraction model, and the object management server 200 classifies the object in a hierarchical manner using the hierarchical model in which the object type inference model is included. In the following, advantages obtained from the hierarchical object classification will be described. In other words, advantages obtained when a system is constructed by combining a high-level category detection model with a model that crops an object found by the high-level model and classifies the object's class instead of directly determining a specific class of an object by employing an AI model in one stage are as follows.

For example, in the case of food, food images are collected to train a model. At this time, food such as rice, napa cabbage kimchi, and diced radish kimchi appear relatively more frequently, while food such as balloon flower root salad, bracken salad, and stir-fried anchovies appear less frequently. Then, when food images include rice, napa cabbage kimchi, cubed radish kimchi, balloon flower root salad, bracken salad, and stir-fried anchovies, all the food images need to be labeled to prepare training data to construct a one-stage model.

However, according to the embodiment of the present disclosure, it is possible to create an artificial intelligence system that combines a model A to find food and a model B to crop and classify the food found. According to an embodiment of the present disclosure, if all foods are found from a food image, model A does not need to learn more about the food image. Therefore, according to the embodiment of the present disclosure, model training may proceed by labeling and cropping only the data that model B requires for food classification (e.g., bracken salad, stir-fried anchovies, or balloon flower root salad).

As an additional advantage of the present disclosure, a one-stage model may not be able to recognize food that it has never seen before.

However, since the object identification apparatus 100 according to an embodiment of the present disclosure operates based on a model that has learned several foods as one class called 'food,' the object identification apparatus 100 may provide an advantage in that food may be inferred even when new food is seen by using a model that has learned the overall characteristics of food.

Furthermore, embodiments of the present disclosure may be applied not only to the food domain but also to the autonomous navigation domain. Suppose transportation means that a car needs to recognize are grouped into a category (e.g., cars, bicycles, and cultivators) and then classified into specific categories; if a sufficiently effective car detection model is available, the cost of labeling cars may be reduced, while more resources may be allocated for the labeling of cultivators. Therefore, efficient labeling and fast model development may be achieved. Also, the embodiment of the present disclosure may increase the possibility of recognizing a tractor as a 'transportation means' even when the tractor is seen for the first time.

Figure 3:
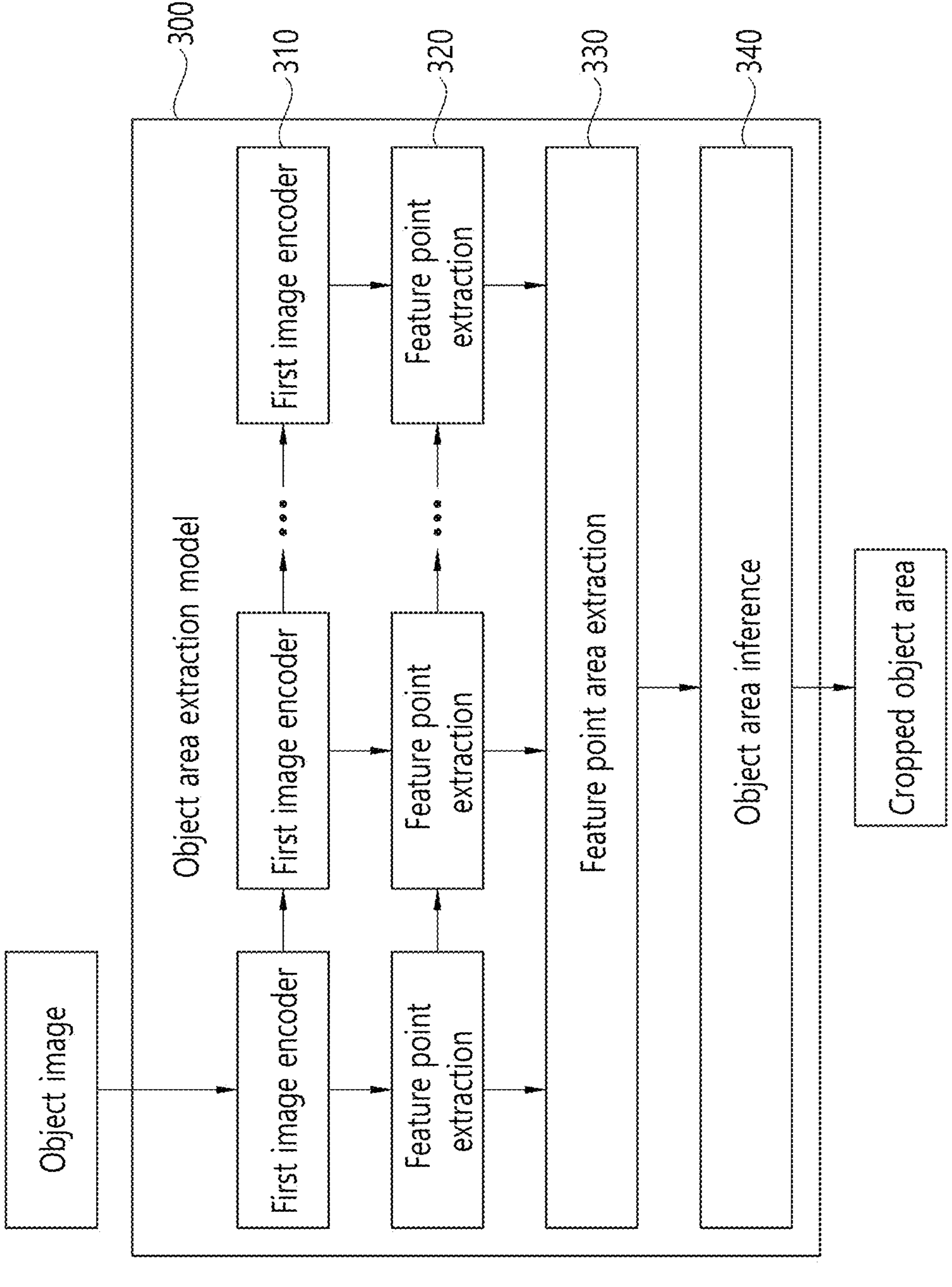
FIG. 3 illustrates an object area inference model used in one embodiment of the present disclosure.

FIG. 3 illustrates an object area inference model used in one embodiment of the present disclosure.

As shown in FIG. 3, the object identification apparatus 100 may detect an object area from an object image in which the object is located based on an object area inference model 300.

The object area inference model 300 executed in the object identification apparatus 100 performs a first encoding operation by entering an input object image to a first encoder 310. The object area inference model 300 extracts feature points from the object image through the first encoding operation. Here, the object area inference model 300 may be constructed based on a structure in which a plurality of first encoders 310 and a plurality of feature point extraction blocks 320 are connected to each other in a sequential manner.

Then the object area inference model 300 extracts a feature point area using a plurality of extracted feature points 330 and infers an object area from the object image using the extracted feature point area 340.

Afterward, the object area inference model 300 crops the inferred object area and outputs the cropped object area.

Figure 4:
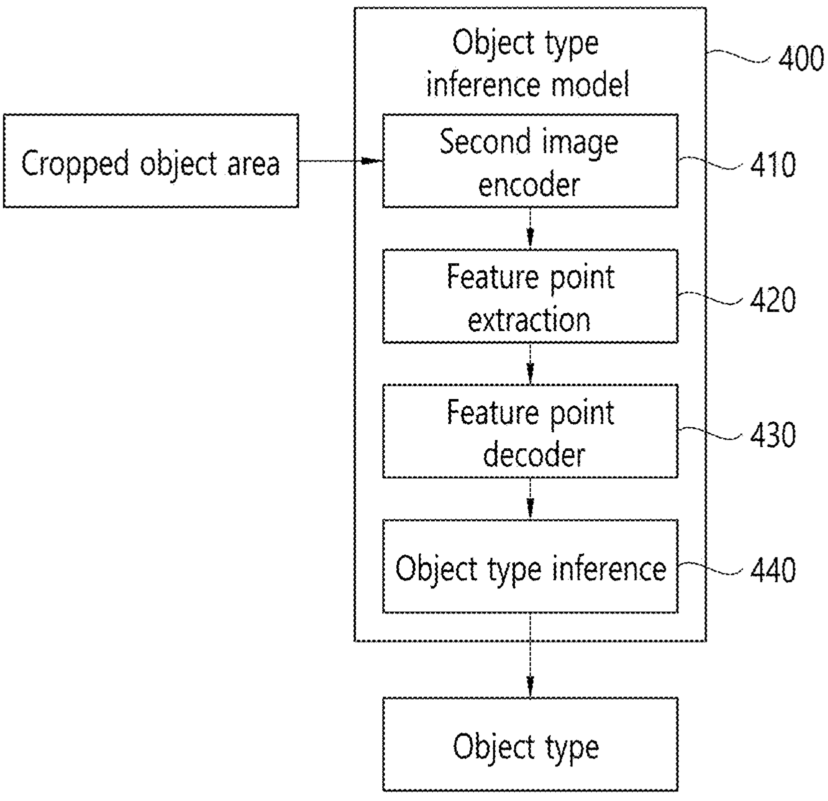
FIG. 4 illustrates an object type inference model used in one embodiment of the present disclosure.

FIG. 4 illustrates an object type inference model used in one embodiment of the present disclosure.

As shown in FIG. 4, the object identification apparatus 100 may identify object type information using the classified category and the corresponding object type inference model 400.

The object type inference model 400 executed in the object identification apparatus 100 performs a second encoding operation by entering an input cropped object area image to a second encoder 410. The object type inference model 400 extracts feature points from the cropped object area image through the second encoding operation 420. Here, the object type inference model 400 may include one second encoder 410 and one feature point decoder 430 unlike the object area inference model 300.

Then the object type inference model 400 performs a feature point decoding operation by entering feature points from the extracted cropped object area to the feature point decoder 430. Subsequently, the object type inference model 400 infers the object type of an object located in the cropped object area using the result of feature point decoding 440.

Afterward, the object type inference model 400 outputs the inferred object type.

Meanwhile, when a general AI technique is employed to analyze an object, the operation of determining the object location (e.g., a box or pixels) and the operation of determining the object type are performed in one model simultaneously.

The object identification apparatus 100 according to one embodiment of the present disclosure may detect an object area from an object image in which the object is located based on an object area inference model 300 and identify the object type information based on the object type inference model 400. In other words, the object identification apparatus 100 includes the object area inference model 300 searching an object image for objects and the object type inference model 400 analyzing the type of objects found in the object image.

Here, the object identification apparatus 100 may classify the object type of an object located in the cropped object area and analyze the object type. Alternatively, object identification apparatus 100 may analyze the object type without classifying the object type category of the object located in the cropped object area.

As described above, when the object area inference model 300 and the object type inference model 400 are separated, the following advantages may be obtained.

First, since the object area inference model 300 and the object type inference model 400 are separated, training data for each model may be prepared separately. When a single object model is used, object images are collected to create training data. When new objects and previously known objects are included together in the object image, the single object model requires labeling even for the previously known objects. If labeling is not applied, the single object model may eventually forget the corresponding object. On the other hand, when the object model is separated according to one embodiment of the present disclosure, only new objects need to be labeled. Since only the corresponding area containing an object is cropped from the object image and learned, the object identification apparatus 100 does not require labeling of previously known objects.

Second, because the object area inference model 300 and the object type inference model 400 are separated, recognition performance may be enhanced for new objects appearing in the object image. The single-object model may fail to recognize a new object with a high possibility because the single-object model will only find those already known objects. On the other hand, when the object model is separated according to one embodiment of the present disclosure, an object model may be constructed, which learns feature points of objects from object images by being exposed to various objects. Accordingly, the object area inference model 300 may recognize and detect an object even if the object appears for the first time in an object image and the object type is not determined accurately.

Figure 5:
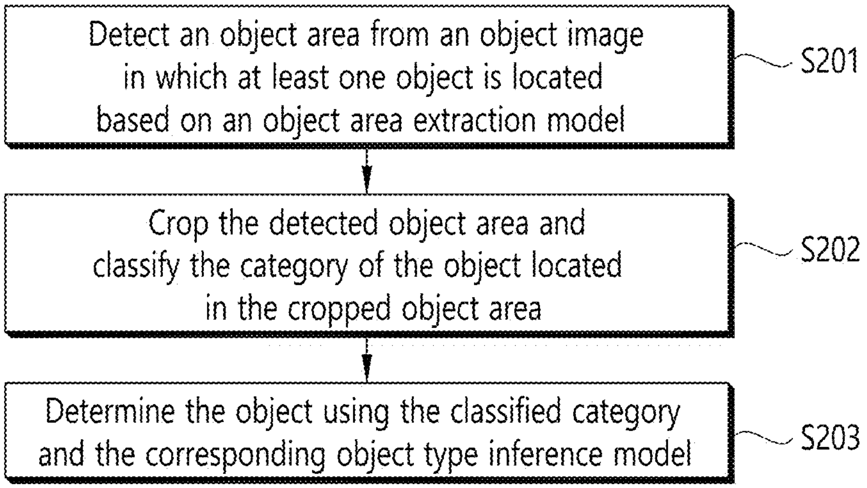
FIG. 5 is a flow diagram illustrating an object identification method using a hierarchical model according to one embodiment of the present disclosure.

FIG. 5 is a flow diagram illustrating an object identification method using a hierarchical model according to one embodiment of the present disclosure.

As shown in FIG. 5, in the S201 step, the object identification apparatus 100 using a hierarchical model according to one embodiment of the present disclosure detects an object area from an object image in which at least one object is located based on an object area extraction model.

In the S202 step, the object identification apparatus 100 crops the detected object area and classifies the category of the object located in the cropped object area.

In the S203 step, the object identification apparatus 100 determines the object using the classified category and the corresponding object type inference model.

FIGS. 6 to 9 illustrate object identification operation using a hierarchical model according to one embodiment of the present disclosure.

The object identification apparatus 100 may determine the object information through the operations illustrated in FIGS. 6 to 9 to distinguish objects contained in the object image.

Figure 6:
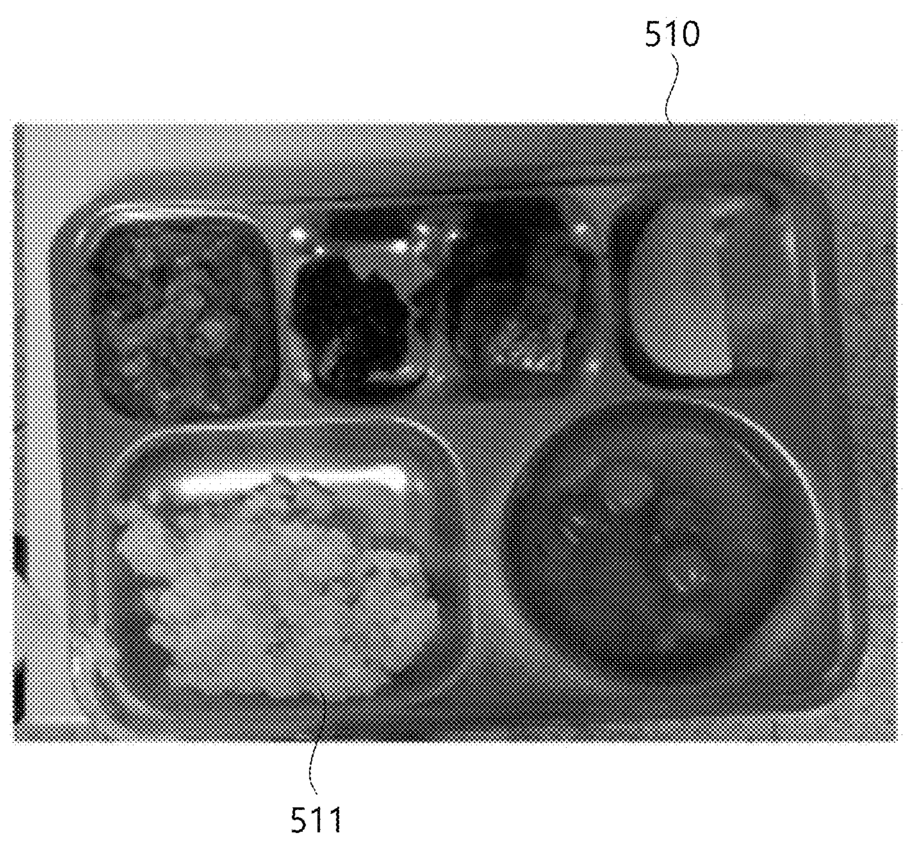
FIGS. 6 to 9 illustrate object identification operation using a hierarchical model according to one embodiment of the present disclosure.

As shown in FIG. 6, the object identification apparatus 100 may receive an object image 510. The object image 510 may be an original image containing the object 511. The object image 510 may be an object image captured through a camera installed in the object identification apparatus 100 or an object image currently captured through the camera and displayed on a screen. The object image 510 may include at least one object 511. In the object image 510, the object 511 may be held in a tableware or a food tray.

Figure 7:
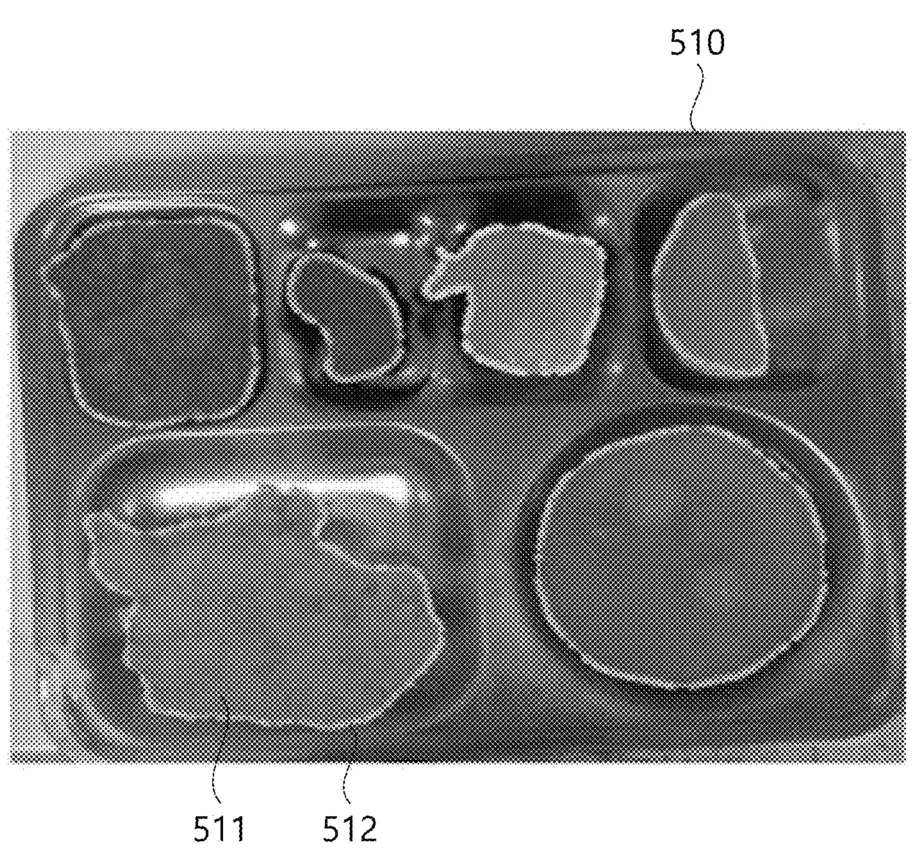

As shown in FIG. 7, the object identification apparatus 100 may check in which area the object 511 is located in the object image 510 based on the trained object area extraction model 300. The object identification apparatus 100 may detect from the object image 510 an area 512 in which the object is located and a non-object area in which something other than the object is located.

For example, the object identification apparatus 100 may find a box surrounding the object 511 from the object image 510 based on the trained object area extraction model 300. The object identification apparatus 100 may detect the object area 512 using the box surrounding the object. The object identification apparatus 100 may detect the remaining area except for the box surrounding the object 511 as a non-object area. Alternatively, the object identification apparatus 100 may detect edges surrounding the object and detect the area obtained by connecting the detected edges as an object area.

In another example, the object identification apparatus 100 may find pixels occupied by the object 511 in the object image 510 based on the trained object area extraction model 300. The object identification apparatus 100 may detect the object area 512 using the pixels occupied by the object. The object identification apparatus 100 may detect the remaining area except for the pixels occupied by the object as a non-object area.

The operation of object area detection using a box or pixels in the object image 510 is described below. The object identification apparatus 100 first receives an object image. Then the object identification apparatus 100 may extract a feature map for the object image through a convolutional neural network from the object image. Subsequently, the object identification apparatus 100 may extract an object area exhibiting characteristics of the object from the extracted feature map.

Figure 8:
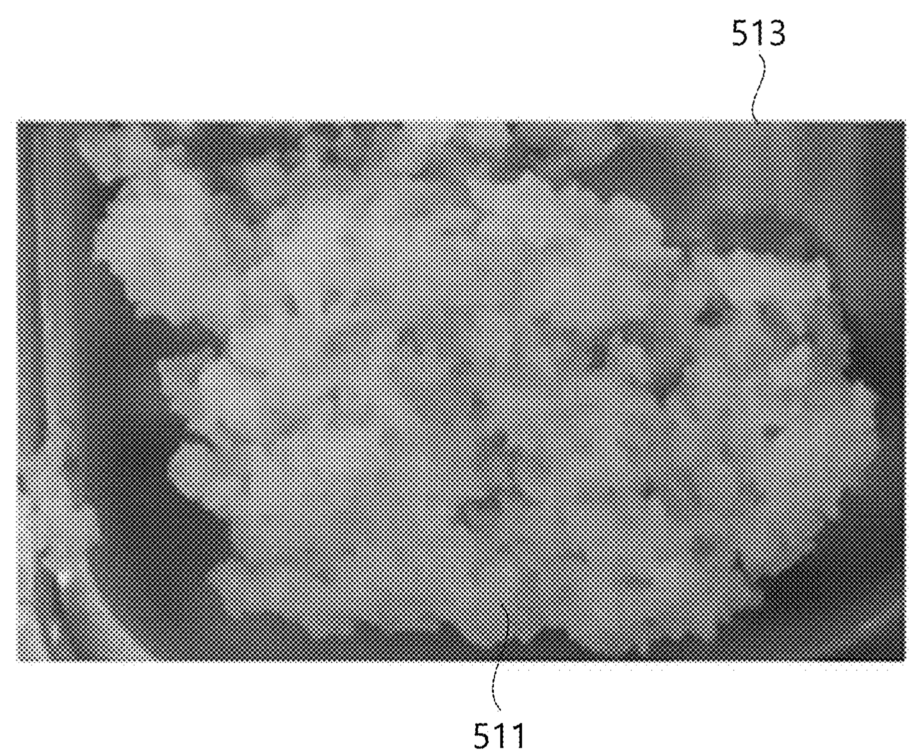

As shown in FIG. 8, the object identification apparatus 100 may crop the object area detected from the image of FIG. 6 and classify the category of the object 511 located in the cropped object area 513. Here, the object identification apparatus 100 may cut out the object area 512 by cropping the box that contains the object area 512 detected from the image of FIG. 6.

At this time, the object identification apparatus 100 may classify the object category of the object 511 included in the cropped object area 513 by gradually descending the object categories from the highest category. For example, the object identification apparatus 100 may classify the object category into a specific major category among a plurality of major categories corresponding to the highest category. For example, if the object included in the cropped object area is Korean food, the object identification apparatus 100 may classify the object category into a broader category representing Korean cuisine. The object identification apparatus 100 may find the category of the corresponding object among comprehensive ranges such as rice, soup, rice bowls, noodles, kimchi, and dessert. In FIG. 8, the object identification apparatus 100 may determine that the object included in each cropped object area is a rice type and classify the object category into the rice category. If the highest category containing the corresponding object is Korean, Japanese, Chinese, or Western food, the corresponding object category may be found among the highest categories.

The object category is not limited to a specific category, and the object identification apparatus 100 may classify the object category by sequentially descending from the highest category that may include the object in the first place. Here, suppose the highest category of the object is a major classification, the next highest category is a middle classification, and the lowest category is a minor classification; then, the object identification apparatus 100 may perform the major classification for the object area in the first place, perform the middle classification among the categories from the major classification for the object area in the second place, and perform the minor classification among the categories from the middle classification for the object area in the third place.

Figure 9:
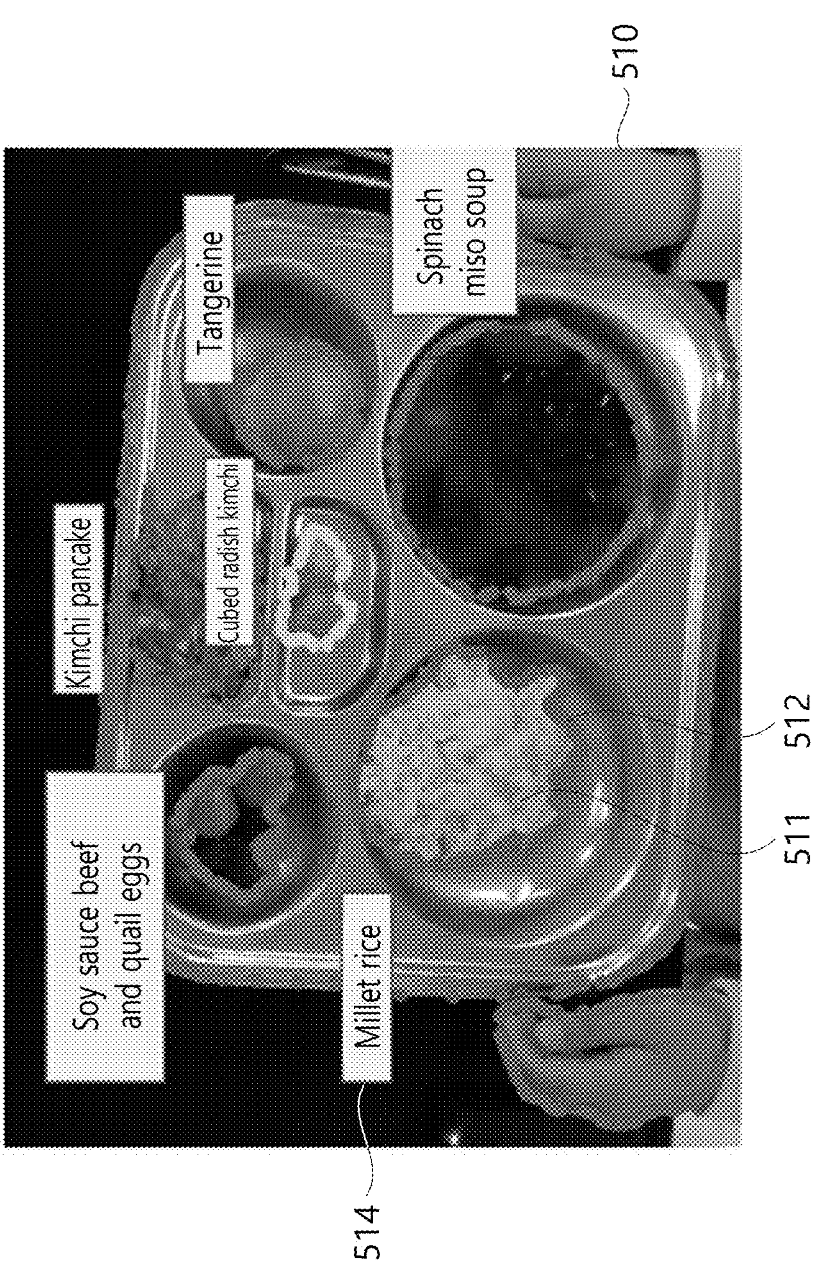

As shown in FIG. 9, the object identification apparatus 100 may classify the object categories for all objects included in the object area 512 of the object image 510 in the first place and finally determine the object information 514 using the classified category and the corresponding object type inference model 400. When the object identification apparatus 100 classifies the category of the object area 512 as a rice type, the object identification apparatus 100 may determine the object information 514 as millet rice using a rice object inference model corresponding to the rice type. For example, the object identification apparatus 100 may determine a specific rice type using a rice object inference model corresponding to the rice type, namely, an object model that may distinguish rice, black rice, or black bean rice belonging to a lower category of the rice category. In FIG. 8, the object identification apparatus 100 may finally determine the object included in the object area as millet rice using a rice object inference model corresponding to the rice type.

Afterward, the object identification apparatus 100 may accurately determine which object is located in the object image by performing an operation of determining object information using the same object identification method for each object included in the object area detected from the object image 510. For example, the object identification apparatus 100 may finally determine the object information for each object included in the object food tray as millet rice, spinach miso soup, soy sauce beef and quail eggs, kimchi pancake, cubed radish kimchi, and tangerine. At this time, the object identification apparatus 100 may determine the object category down to the lowest category and, among the determined object categories, determine object information corresponding to the lowest object category by using variants of the object type inference model 400, e.g., rice object inference model, soup object inference model, and a side dish object inference model.

Figure 10:
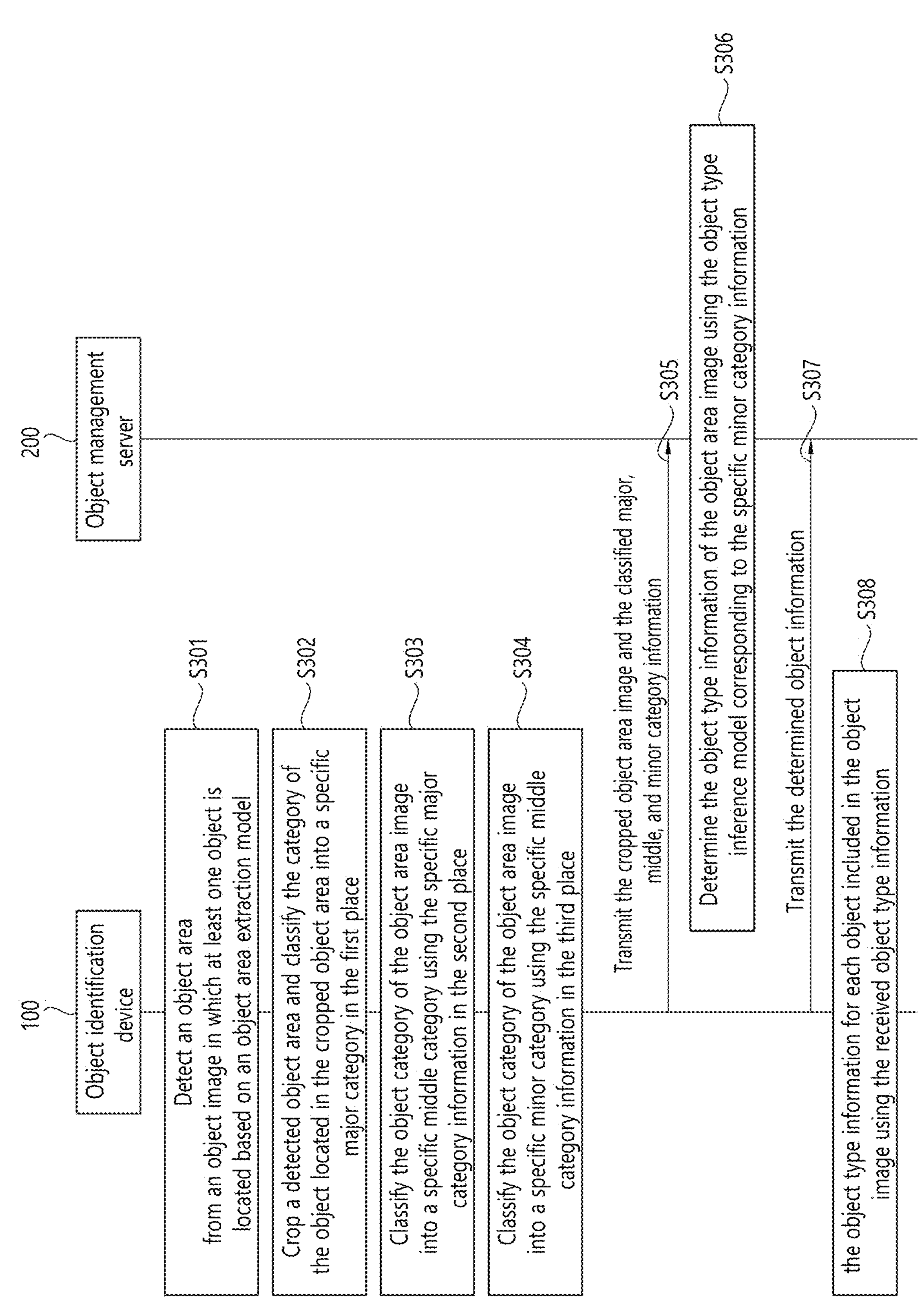
FIG. 10 illustrates the operation of an object identification method using a hierarchical model in conjunction with an object management server according to one embodiment of the present disclosure.

FIG. 10 illustrates the operation of an object identification method using a hierarchical model in conjunction with an object management server according to one embodiment of the present disclosure.

FIG. 10 illustrates an object identification operation through a cooperative operation between the object identification apparatus 100 and the object management server 200 when an object included in an object area cropped from an object image is classified into object categories from the highest category to the lowest category through major, middle, and minor classification. Here, the object category is based on a hierarchical structure and is not limited to a specific number of layers. For example, the object category may be classified into two layers, namely, major classification and middle classification or three layers, namely, major, middle, and minor classification. Since object categories may be classified into categories containing n layers, where n is a natural number; therefore, the object categories are not limited to specific layers.

At this time, the object identification apparatus 100 may be preset with category layers that have to be classified first among the entire category classification operations. Alternatively, the object identification apparatus 100 may adjust categories to be classified by considering a real-time issue or the apparatus's resource status, or computational load at the time of classification. Meanwhile, since the object management server 200 has higher classification performance and more available resources than the object identification apparatus 100, the object management server 200 may perform an operation that would be less efficient in terms of time or accuracy if performed on the object identification apparatus 100 and transmit the corresponding result to the object identification apparatus 100.

For example, while the operation of cropping an object area from an object image and classifying the cropped object area based on major, middle, and minor categories takes little time or load, when the operation of determining specific object information requires a large amount of computation and resultant information exhibits low accuracy, the object management server 200 may perform the latter operation for the object identification apparatus 100. Through the operation, the object management server 200 may reduce the identification time or improve identification accuracy by performing operations that are difficult for the object identification apparatus 100 to perform alone.

As shown in FIG. 10, in the S301 step, the object identification apparatus 100 detects an object area from the object image in which at least one object is located based on an object area extraction model.

In the S302 step, the object identification apparatus 100 crops a detected object area and classifies the category of the object located in the cropped object area into a specific major category in the first place.

In the S303 step, the object identification apparatus 100 classifies the object category of the object area image into a specific middle category using the specific major category information in the second place.

In the S304 step, the object identification apparatus 100 classifies the object category of the object area image into a specific minor category using the specific middle category information in the third place.

In the S305 step, the object identification apparatus 100 transmits the cropped object area image and the classified major, middle, and minor category information.

In the S306 step, the object management server 200 determines the object type information of the object area image using the object type inference model corresponding to the specific minor category information.

In the S307 step, the object management server 200 transmits the determined object information to the object identification apparatus 100.

In the S308 step, the object identification apparatus 100 checks the object type information for each object included in the object image using the received object type information.

As described above, the example of the object identification operation in FIG. 10 illustrates a case in which the object identification apparatus 100 performs the category classification operation, and the object management server 200 performs the object information determination operation. Here, the entity performing each step may differ. For example, the entity performing the category classification operation for each step and the object information identification operation may vary according to the number of objects included in the object image, the size or capacity of the object image, the time required to extract object information contained in the object image, communication status between the object identification apparatus 100 and the object management server 200, and the state of an object model stored in the object identification apparatus 100.

Meanwhile, a non-transitory computer-readable storage medium may be provided for storing instructions used by a processor to execute a method, the method executed by the processor comprises detecting an object area from an object image in which an object is located based on a trained object area extraction model and cropping the detected object area by an object identification apparatus; and identifying object type information of an object located in the object area cropped by the object identification apparatus based on an object type inference model by an object management server.

Meanwhile, according to one embodiment of the present disclosure, various embodiments described above may be implemented by software including instructions stored in a machine (e.g., computer)-readable storage media. The machine is an apparatus capable of calling stored instructions from the storage medium and operating according to the instructions called, which may include an electronic apparatus (e.g., an electronic apparatus A) according to the disclosed embodiments. When a command is executed by the processor, the processor may perform the function corresponding to the command directly or by using other constituting elements under the control of the processor. The command may include code generated or executed by a compiler or an interpreter. The machine-readable storage medium may be provided in the form of a non-transitory storage medium. Here, the term 'non-transitory' only indicates that the storage medium does not include a signal and is tangible but does not distinguish whether data are stored semi-permanently or temporarily.

Also, according to one embodiment of the present disclosure, the method according to various embodiments described above may be provided by being included in a computer program product. The computer program product may be traded between sellers and buyers as a commodity. The computer program product may be distributed in the form of a machine-readable storage medium (e.g., a Compact Disc Read Only Memory (CD-ROM)) or online through an application store (for example, Play Store™). In the case of online distribution, at least part of the computer program product may be at least stored temporarily or generated temporarily in a server of the manufacturer, a server of the application store, or a storage medium such as a memory of a relay server.

Also, according to one embodiment of the present disclosure, various embodiments described above may be implemented in a recording medium that may be read by a computer or a machine similar thereto by using software, hardware, or a combination of both. In some cases, the embodiments of the present disclosure may be implemented within a processor itself. In the case of software implementation, the embodiments such as procedures and functions according to the present disclosure may be implemented by separate software modules. Each of the software modules may perform one or more functions and operations according to the present disclosure.

The computer instructions for executing processing operations of the machine according to various embodiments described above may be stored in a non-transitory computer-readable medium. When executed by a processor of a specific machine, the computer instructions stored in the non-transitory computer-readable medium command the specific machine to perform processing operations for an apparatus according to the various embodiments described above. The non-transitory computer-readable medium refers to a medium that stores data semi-permanently and that may be read by a machine, rather than a medium that stores data for a short time period such as a register, a cache, and a memory. Specific examples of the non-transitory computer-readable medium include a CD, a DVD, a hard disk, a Blu-ray disk, a USB memory, a memory card, and a ROM.

Also, each of the constituting elements (e.g., a module or a program) according to the various embodiments of the present disclosure may be composed of a single or multiple entities; and part of the corresponding sub-elements described above may be omitted, or another sub-element may be further included in the various embodiments. Alternatively or additionally, part of the constituting elements (for example, a module or a program) may be integrated into a single entity, and the functions executed by the respective constituting elements prior to the integration may be performed in the same manner or in a similar manner. The operations executed by a module, a program, or another constituting element according to the various embodiments may be performed in a sequential, parallel, or heuristic manner; or at least part of the operations may be performed in a different order or omitted, or another operation may be added to the operations.

Throughout the document, preferred embodiments of the present disclosure have been described with reference to appended drawings; however, the present disclosure is not limited to the embodiments above. Rather, it should be noted that various modifications of the present disclosure may be made by those skilled in the art to which the present disclosure belongs without leaving the technical scope of the present disclosure defined by the appended claims, and these modifications should not be understood individually from the technical principles or perspectives of the present disclosure.

| Detailed Description of Main Elements |
|---|
| 10: Object identification system |
| 100: Object identification apparatus |
| 110: Communication module |
| 120: Camera |
| 130: Display |
| 140: Memory |
| 150: Processor |
| 200: Object management server |
| 210: Communication module |
| 220: Memory |
| 230: Processor |

The invention claimed is:

1. An object identification method performed by an object identification system, the method comprising:
   - detecting an object area from an object image in which an object is located based on a trained object area extraction model and cropping the detected object area by an object identification apparatus;
   - identifying object type information of an object located in the object area cropped by the object identification apparatus based on an object type inference model by an object management server; and
   - classifying an object type category of an object located in the cropped object area by the object identification apparatus in a stepwise manner,
   - wherein the identifying of the object type information identifies object type information using the classified category and the corresponding object type inference model by the object management server.

2. The method of claim 1, wherein the cropping of the detected object area detects an object area from the object image based on the trained object area extraction model by using a box surrounding the object or pixels occupied by the object.

3. The method of claim 1, wherein the cropping of the detected object area infers an object area by extracting a first feature point through a first image encoder of the trained object area extraction model and extracting a feature point area from the extracted first feature point.

4. The method of claim 1, wherein the classifying of the object type category in a stepwise manner classifies the category of an object located in the cropped object area sequentially from a highest major classification to a lowest minor classification by the object identification apparatus.

5. The method of claim 4, wherein the identifying of the object type information identifies object type information using the lowest minor category, which is the classified category, and the corresponding object type inference model by the object management server.

6. The method of claim 4, wherein the identifying of the object type information determines the object type information as one of a plurality of classes belonging to the lowest minor category by the object management server.

7. The method of claim 1, wherein the identifying of the object type information extracts a second feature point through the classified category and a second image encoder of the corresponding object type inference model and infers object type information by entering the extracted second feature point into a feature point decoder by the object management server.

8. An object identification system using a hierarchical model, the system comprising:
   - an object identification apparatus detecting an object area from an object image in which an object is located based on a trained object area extraction model and cropping the detected object area; and
   - an object management server identifying object type information of an object located in the object area cropped by the object identification apparatus based on an object type inference model,
   - wherein the object identification apparatus classifies an object type category of an object located in the object area cropped by the object identification apparatus in a stepwise manner, and
   - the object management server identifies object type information using the classified category and the corresponding object type inference model.

9. The system of claim 8, wherein the object identification apparatus detects an object area from the object image based on the trained object area extraction model by using a box surrounding the object or pixels occupied by the object.

10. The system of claim 8, wherein the object identification apparatus infers an object area by extracting a first feature point through a first image encoder of the trained object area extraction model and extracting a feature point area from the extracted first feature point.

11. The system of claim 8, wherein the identification apparatus classifies the category of an object located in the cropped object area sequentially from a highest major classification to a lowest minor classification.

12. The system of claim 8, wherein the object management server identifies object type information using the lowest minor category, which is the classified category, and the corresponding object type inference model.

13. The system of claim 8, wherein the object management server determines the object type information as one of a plurality of classes belonging to the lowest minor category.

* * * * *